United States Patent
Baker et al.

(10) Patent No.: US 8,246,002 B1
(45) Date of Patent: Aug. 21, 2012

(54) CONCRETE PANEL MOLD HAVING REINFORCED LOWER SUPPORT GASKET FOR VERTICALLY FORMING CONCRETE PANELS

(75) Inventors: William Brent Baker, Heber, UT (US); Mike Sharp, Sandy, UT (US); David McKay Balls, Oakley, UT (US); Laurie Balls, legal representative, Oakley, UT (US); Daniel M. Balls, Oakley, UT (US)

(73) Assignee: Verti-Crete, LLC, Sandy, UT (US)

( * ) Notice: Subject to any disclaimer, the term of this patent is extended or adjusted under 35 U.S.C. 154(b) by 884 days.

(21) Appl. No.: 12/234,545

(22) Filed: Sep. 19, 2008

Related U.S. Application Data (63) Continuation-in-part of application No. 11/699,767, filed on Jan. 29, 2007, now Pat. No. 7,661,649, which is a continuation-in-part of application No. 10/676,670, filed on Sep. 30, 2003, now Pat. No. 7,182,307.

(51) Int. Cl.
*B28B 7/24* (2006.01)
*B41B 11/68* (2006.01)

(52) U.S. Cl. ........................ 249/119; 249/160

(58) Field of Classification Search .................. 249/91, 249/93, 119, 120, 126, 163, 134, 160; 152/527, 152/539, 540
See application file for complete search history.

(56) References Cited

U.S. PATENT DOCUMENTS

| | | | |
|---|---|---|---|
| 434,881 A | 8/1890 | Whittaker |
| 547,966 A | 10/1895 | Reese |
| 887,814 A | 5/1908 | Johnson |
| 1,194,862 A | 8/1916 | Moore |
| 1,607,114 A | 11/1926 | Albert |
| 1,623,178 A | 4/1927 | Edward |
| 1,628,385 A | 5/1927 | Bruno |
| 1,760,282 A | 5/1930 | Pedersen |
| 1,767,163 A | 6/1930 | Hugo |
| 2,522,603 A | 9/1950 | Case |
| 2,659,123 A | 11/1953 | Georgii et al. |
| 2,705,851 A | 4/1955 | Duerr |
| 2,736,942 A | 3/1956 | Dudley |
| 2,763,909 A | 9/1956 | Guimont |
| 3,010,174 A | 11/1961 | McCall |
| 3,110,949 A | 11/1963 | Di Tullio et al. |
| 3,381,929 A | 5/1968 | Banker |
| 3,471,910 A | 10/1969 | Slavin |
| 3,488,817 A | 1/1970 | Katz |

(Continued)

FOREIGN PATENT DOCUMENTS

DE        7147209        3/1974

(Continued)

OTHER PUBLICATIONS

Baker, U.S. Appl. No. 11/699,767, filed Jan. 29, 2007.

(Continued)

*Primary Examiner* — Michael Safavi
(74) *Attorney, Agent, or Firm* — Thorpe North & Western LLP (57) ABSTRACT

A support gasket for use with a concrete panel mold system comprises an inner stiffener bar and engagement structure, attached to or formed integrally with the stiffening bar. The engagement structure is operable to engage an adjacent material. A pliable gasket material is disposed about the inner stiffening bar and is positively engaged with the engagement structure to secure the gasket material to the stiffening bar.

5 Claims, 5 Drawing Sheets

U.S. PATENT DOCUMENTS

| | | | |
|---|---|---|---|
| 3,511,467 A | 5/1970 | Rohrer | |
| 3,519,243 A | 7/1970 | Kleiber et al. | |
| 3,645,490 A | 2/1972 | Beasley | |
| 3,704,852 A | 12/1972 | Wellander | |
| 3,743,235 A | 7/1973 | Shelley | |
| 3,804,361 A | 4/1974 | Camus | |
| 3,844,524 A | 10/1974 | Fisher et al. | |
| 4,004,874 A | 1/1977 | Foster | |
| 4,135,695 A | 1/1979 | Capdevila et al. | |
| 4,191,521 A | 3/1980 | Muldery et al. | |
| 4,266,922 A | 5/1981 | Birjukov et al. | |
| 4,545,416 A | 10/1985 | Itoh et al. | |
| 4,609,499 A | 9/1986 | Esashi et al. | |
| 4,614,325 A | 9/1986 | Muldery et al. | |
| 5,284,326 A | 2/1994 | Chiovitti et al. | |
| 5,556,488 A | 9/1996 | Gergele et al. | |
| 5,871,787 A | 2/1999 | Fitzgerald et al. | |
| 5,887,404 A | 3/1999 | Kreizinger | |
| 6,086,806 A | 7/2000 | Weatherall et al. | |
| 6,105,924 A | 8/2000 | Carr | |
| 6,403,696 B1 | 6/2002 | Barber et al. | |
| 6,620,364 B2 | 9/2003 | Gresser et al. | |
| 6,854,702 B2 | 2/2005 | Manthei et al. | |
| 7,182,301 B1 | 2/2007 | Oddsen, Jr. et al. | |
| 7,182,307 B2 | 2/2007 | Baker et al. | |
| 7,661,649 B2 | 2/2010 | Baker et al. | |
| 7,828,544 B2 | 11/2010 | Di Lorenzo | |
| 8,025,493 B2 | 9/2011 | Petrov | |
| 2001/0008319 A1 | 7/2001 | Kistner et al. | |
| 2005/0016123 A1 | 1/2005 | Jucha et al. | |
| 2006/0137273 A1 | 6/2006 | Baker et al. | |
| 2006/0174569 A1 | 8/2006 | Stott | |
| 2006/0180735 A1 | 8/2006 | Baker et al. | |
| 2009/0173871 A1 | 7/2009 | Stott et al. | |
| 2009/0173872 A1 | 7/2009 | Stott et al. | |

FOREIGN PATENT DOCUMENTS

| | | |
|---|---|---|
| DE | 3403565 | 8/1985 |
| FR | 764733 | 5/1934 |
| GB | 1 369 862 | 10/1974 |
| JP | 02045108 | 2/1990 |
| JP | 2002210722 | 7/2002 |
| WO | WO 94-22648 | 10/1994 |
| WO | WO 9737834 | 10/1997 |

OTHER PUBLICATIONS

U.S. Appl. No. 12/906,355, filed Oct. 18, 2010, William Brent Baker.
Baker, U.S. Appl. No. 11/302,414, filed Dec. 12, 2005.
U.S. Appl. No. 12/906,355, filed Oct. 18, 2010, William Brent Baker; office action issued Dec. 22, 2011.
PCT Application PCT/EP04/789461; filed Sep. 30, 2004; William Brent Baker; Supplementary European Search Report completed Dec. 14, 2011.
US Appl. No. 12/906,355; filed Oct. 18, 2010; William Brent Baker; office action issued Apr. 25, 2012.

CONCRETE PANEL MOLD HAVING REINFORCED LOWER SUPPORT GASKET FOR VERTICALLY FORMING CONCRETE PANELS

PRIORITY

This is a continuation-in-part application of U.S. patent application Ser. No. 11/699,767, filed Jan. 29, 2007, which is a continuation-in-part of U.S. patent application Ser. No. 10/676,670, filed Sep. 30, 2003, now issued as U.S. Pat. No. 7,182,307, both of which are hereby incorporated herein by reference.

BACKGROUND

Vertically forming concrete panels is a process that has been used for many years. One superior system for doing so is disclosed in U.S. Pat. No. 7,182,307, to at least some of the present inventors. While such systems have proved effective, there remain a number of issues to be addressed. One such issue relates to the considerable weight applied by wet concrete to a mold framework after the wet concrete has been poured into the mold. In the case where a lower form is used in a mold frame to define or support a bottom surface of the vertical panel being formed, the lower form must carry the entire weight of the wet (and, later, the cured) concrete within the form. As such, many lower forms used in such systems become prematurely worn or damaged.

SUMMARY OF THE INVENTION

In accordance with one embodiment, the invention provides a concrete mold device for vertically forming a concrete panel, including a plurality of concrete forms for collectively defining a mold cavity for receiving an uncured concrete mixture therein. The concrete forms can include: i) a pair of opposing side wall forms configured to define side wall surfaces of the mold cavity; ii) a pair of opposing end wall forms, configured to define end wall surfaces of the mold cavity; and iii) an elongate lower support gasket having an upper surface configured to define a bottom surface of the mold cavity, the lower support gasket being formed from a pliable material. Reinforcing structure can be associated with, and can be formed from a different material than, the lower support gasket to increase a load-bearing capacity of the lower support gasket. Engagement structure can be carried by the reinforcing structure. The engagement structure can be operable to positively engage the pliable material of the lower support gasket to secure the lower support gasket to the reinforcing structure.

In accordance with another aspect of the invention, a support gasket for use with a concrete panel mold system is provided, including an inner stiffener bar and engagement structure, attached to or formed integrally with the stiffening bar. The engagement structure can be operable to engage an adjacent material. A pliable gasket material can be disposed about the inner stiffening bar and can positively engage the engagement structure to secure the gasket material to the stiffening bar.

In accordance with another aspect of the invention, a method for forming a lower support gasket for use in a concrete mold system is provided, including: obtaining an stiffener bar; forming in, or attaching to, the stiffener bar engagement structure operable to engage a surrounding material; forming a pliable gasket material about the stiffener bar; and positively engaging the engagement structure with the pliable gasket material to secure the gasket material to the stiffener bar.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention.

In describing and claiming the present invention, the following terminology will be used.

As used here, the term "positively engage" is used to describe a relationship between two components or materials in which the components or materials are mechanically engaged with one another. Examples of positively engaged materials include materials that overlap one another such that separation of the materials would necessarily result in deformation (either permanent or temporary) of one or both the materials. As a negative example, two planar materials that are bonded face-to-face would not be considered positively engaged to one, as that term is used herein, as the forces holding the materials together would result purely from the adhesive between the two faces.

As used herein, relative terms, such as "upper," "lower," "upwardly," "downwardly," "vertically," etc., are used to refer to various components, and orientations of components, of the systems discussed herein, and related structures with which the present systems can be utilized, as those terms would be readily understood by one of ordinary skill in the relevant art. It is to be understood that such terms are not intended to limit the present invention but are used to aid in describing the components of the present systems, and related structures generally, in the most straightforward manner. For example, one skilled in the relevant art would readily appreciate that a "vertical" concrete panel turned on its side would still constitute a vertical panel, despite its lateral orientation.

As used herein, the term "substantially" refers to the complete or nearly complete extent or degree of an action, characteristic, property, state, structure, item, or result. As an arbitrary example, when an object or group of objects is/are referred to as being "substantially" symmetrical, it is to be understood that the object or objects are either completely symmetrical or are nearly completely symmetrical. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As an arbitrary example, an opening that is "substantially free of" material would either completely lack material, or so nearly completely lack material that the effect would be the same as if it completely lacked material. In other words, an opening that is "substantially free of" material may still actually contain some such material as long as there is no measurable effect as a result thereof.

INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
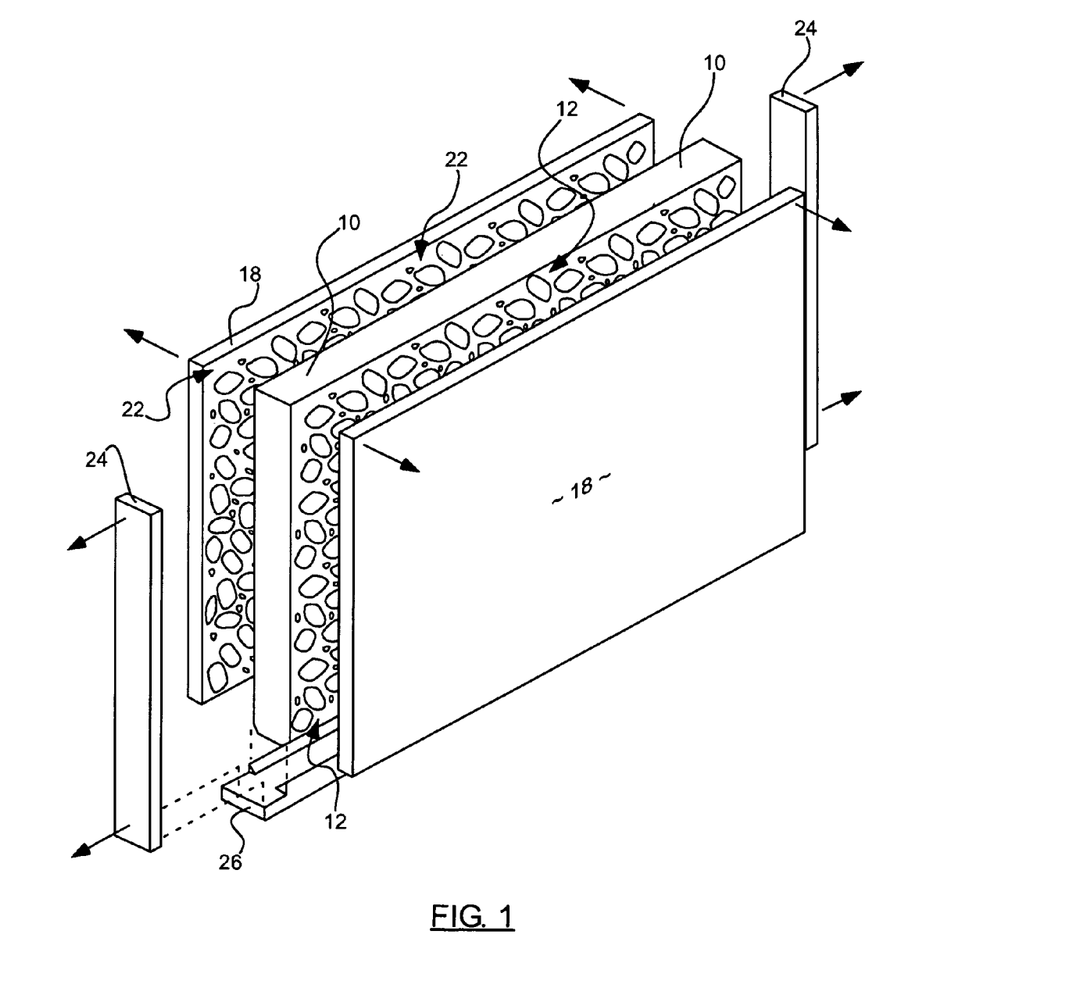
FIG. 1 is a perspective view of a vertical concrete panel forming system in accordance with an embodiment of the present invention, including a formed concrete panel associated therewith.

Illustrated in FIG. 1 is an example of a vertical concrete panel 10 formed in accordance with one aspect of the system described herein. Various forms and structure such as side wall forms 18, end wall forms 24 and lower support gasket 26 can be utilized to form the vertical concrete panel 10. Vertical concrete panels such as that shown are used in a variety of applications, including residential and commercial fencing, sound wall applications, etc. Concrete panels formed in accordance with the present invention generally require little or no maintenance, provide superior strength, and can be relatively quickly assembled on the job site into a fence or other structure. Assembly of the panels into a fence structure is generally accomplished by installing or forming posts (not shown) which include slot structure into which the panels are disposed and held securely.

The concrete panel 10 can include, but does not always include, a decorative pattern 12 formed in at least one side of the panel. In one embodiment of the invention, the decorative pattern is advantageously formed simultaneously in both sides of the panel. The decorative pattern can be formed to appear as a rock wall, a brick wall, or other such desirable patterns. As used herein, the term "decorative pattern" is understood to mean a pattern applied to the concrete panels, and may be decorative or functional, or both, in nature. In addition to the decorative pattern applied to the panel, the concrete panel can be stained or dyed in a particular color scheme to enhance the aesthetically pleasing appearance of the panel.

The present system can be utilized to form concrete panels of a variety of sizes. For example, vertical concrete panels can be formed with a length of 12 feet, a height of 6 or 8 feet, and a thickness of 4 inches. As described in more detail below, panels of varied width can be formed with the present system, including panels with 4, 5 or 6 inch widths. The system can be adapted to provide a number of variously sized and shaped vertical concrete panels with minimal adjustments to the system being necessary to effectuate formation of differently sized panels.

Figure 2:
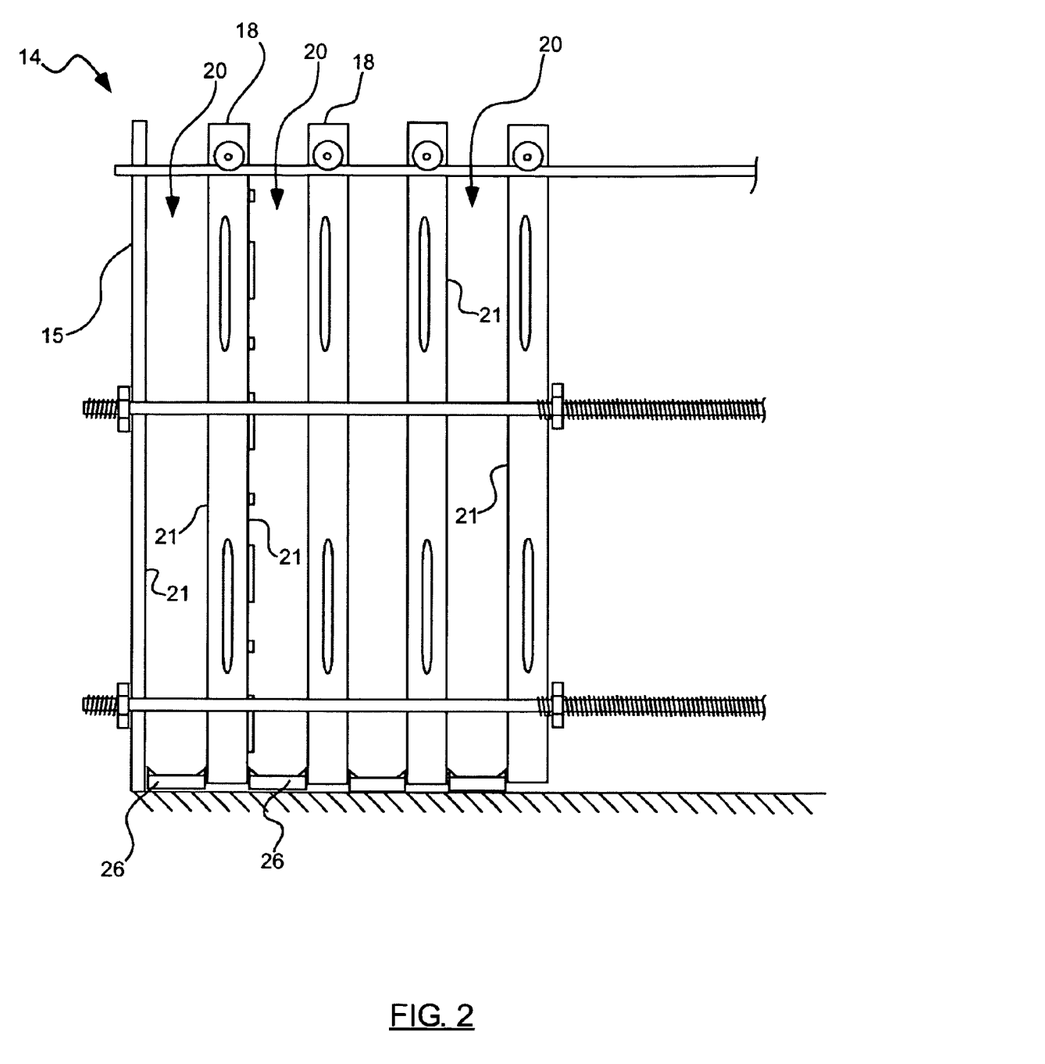
FIG. 2 is a side view of a system for vertically forming concrete panels in accordance with an embodiment of the present invention.

Shown generally at 14 in FIG. 2 is a side view of a system and device in accordance with the present invention that can be used to vertically form concrete panels such as that illustrated in at 10 in FIG. 1. The system can include a generally rectangular support frame assembly 15 which can receive and support a variety of concrete forms. The concrete forms can include a pair of opposing side wall forms 18 which define side wall surfaces 21 of a mold cavity 20. The side wall forms are spaced a desired distance apart, corresponding to a desired thickness of the concrete panel to be formed. End wall forms (24 in FIG. 1) can be positioned adjacent the side wall forms to define end wall surfaces of the mold cavity. An elongate lower support gasket 26 can define a bottom surface of the mold cavity.

Thus, in this embodiment, the side wall forms 18, end wall forms 24 (not shown in FIG. 2) and lower support gaskets 26 are positioned to define a plurality of vertical mold cavities 20 that correspond to a concrete panel to be formed in each cavity. As discussed in further detail below, various tensioning and restraining devices can be used to ensure that the mold forms are not displaced by the introduction of uncured, or "wet" concrete in the mold cavity. Once each mold cavity is defined, and any retaining structure has been applied, wet concrete can be poured into each mold cavity. Vibrators or other agitating devices can be utilized when pouring the wet concrete to minimize voids and ensure the wet concrete fills each cavity to the extent desired.

After pouring, the concrete in the forms can be allowed to cure, after which the various retaining structure and forms can be removed. The cured panels can then be removed from the support frame assembly. In one aspect, the panels are removed by lifting equipment (not shown) which lifts each panel vertically away from the support frame assembly. The process can then be repeated a number of times to create a number of concrete panels. In the case where the proper concrete mix is used, the system can form panels on a one day cycle, that is, panels can be poured in the morning and allowed to cure through the night. The following morning, the cured panels can be removed, the forms can be reassembled, and the process begun again.

The system can be used to simultaneously form a plurality of concrete panels in a manner that utilizes minimal floor space. To illustrate the space efficient manner in which concrete panels can be formed with the present invention, consider the case in which a concrete fence is to be formed from concrete panels having dimensions of 6 feet in height, 10 feet in length and 4 inches in width. Horizontally pouring a sufficient number of panels for a fence of 100 feet in length would require as much as 600 square feet of floor space for the horizontal forms alone. In contrast, concrete panels formed vertically in accordance with the present invention can require about one-tenth of that amount, with as little as only 67 square feet of floor space being required. Because the present system laterally "stacks" vertical concrete mold cavities, optimal space savings can be obtained with the further advantage of vertically forming decorative patterns on both sides of the panels.

The reader is directed to U.S. patent application Ser. No. 11/699,767, filed Jan. 29, 2007, and U.S. Pat. No. 7,182,307, both of which are hereby incorporated herein by reference, for more information relating to the advantages and operating features of the system in general. The following discussion will focus on the lower support gasket 26, and the various support and engagement structures associated therewith.

Figure 3:
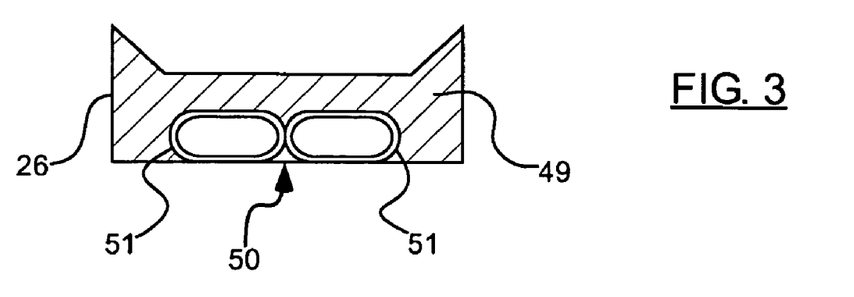
FIG. 3 is an end, sectional view of a lower support gasket in accordance with an embodiment of the invention.

Turning now to FIG. 3, one exemplary lower support gasket 26 in accordance with an embodiment of the invention is illustrated. The lower support gasket can include reinforcing structure 50 associated therewith which can increase a load-bearing capacity of the support gasket. The reinforcing structure can be formed from a variety of materials suitable to increase the load-bearing capacity of the support gasket, including, for example, materials which are stronger and/or stiffer than the support gasket. Examples of suitable materials from which the reinforcing structure can be formed include, without limitation, metallic materials such as steel, aluminum and the like, ceramic materials, graphite-composite materials, and the like. The reinforcing structure can be formed from a material that is different than a material of which the support gasket is formed, and is generally more rigid or stiff than the surrounding support gasket material. The support gasket material can include a variety of materials, including, without limitation, polymeric materials, polyurethane, 21-60 polyurethane, etc.

In one aspect of the invention, the reinforcing structure is comprised of an elongate, generally tubular steel material that extends along a majority of a length of the support gasket. The support gasket material can substantially encompass an outer portion of the reinforcing structure and/or fill a hollow interior portion of the reinforcing structure. While not so limited, in one aspect of the invention the reinforcing material can be formed from structure or material that is separate and distinct from the support gasket material. The reinforcing material can also be oriented within (or immediately adjacent to) the support gasket material in a consistent, uniform manner that is non-random in nature.

In the embodiment illustrated in FIG. 3, the reinforcing structure is disposed at least partially within the lower support gasket to provide support to the gasket without interfering with the concrete pouring process. In this embodiment, the reinforcing structure includes a pair of substantially rectangularly-shaped steel tubes 51. The tubes can minimize the amount of compliant polymer that is needed, such that sufficient polymer is present to seal the mold cavity, but is prevented from deforming to an undesirable level by the reinforcing structure. In addition to the embodiment shown, the reinforcing structure can be disposed on, over, or adjacent to the support gasket to provide reinforcement to the support gasket.

While the reinforcing structure 50 has proved to be an effective addition to the present system, it has been found that it can be difficult to adhere the pliable gasket material 49 of the lower support gasket 26 to the reinforcing structure with a bond integrity sufficient to withstand the considerable forces applied to the lower support gasket 26. After a period of use, the gasket material 49 can begin to "peel" away from the reinforcing structure, leading to premature failure of the lower support gasket. The present invention addresses this issue by associating a variety of different types of engagement structure with the reinforcement structure.

Figure 4:
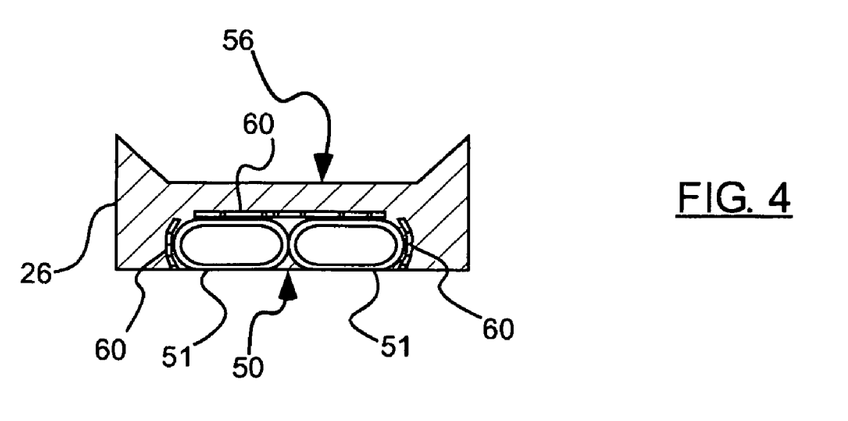
FIG. 4 is an end, sectional view of a lower support gasket in accordance with another aspect of the invention.

In the embodiment of the invention illustrated in FIG. 4, engagement structure 60 is coupled to steel tubes 51 to serve as an interface between the pliable gasket material 49 and the steel tubes. In this manner, a secure bond between the gasket material and the reinforcing structure can be maintained through a significantly longer product life. The reinforcing structure 60 shown in FIG. 4 (and in side view in FIG. 5A) includes a perforated sheet of material that includes a series of cavities 62 defined by a series of walls or ribs 64. In one aspect of the invention, the perforated sheet includes, or is formed from, a sheet of expanded metal, a product readily available from commercial sources. Expanded metal of a variety of types and sizes can be utilized with the present invention.

Figure 5A:
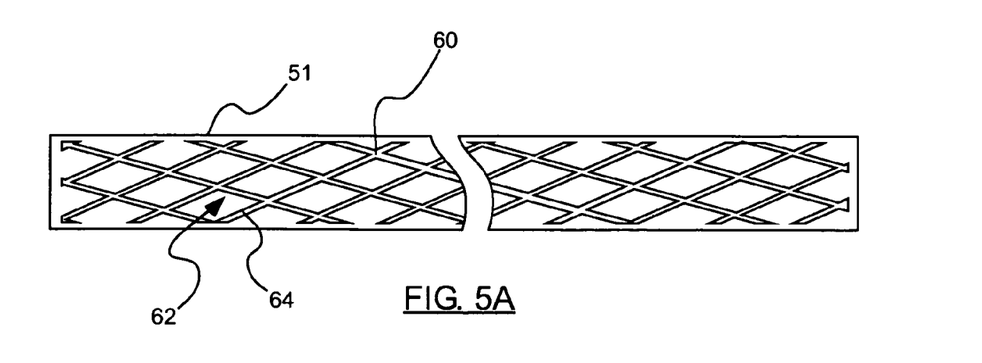
FIG. 5A is a side, sectioned view of a reinforcing tube of the lower support gasket of FIG. 4.
Figure 5B:
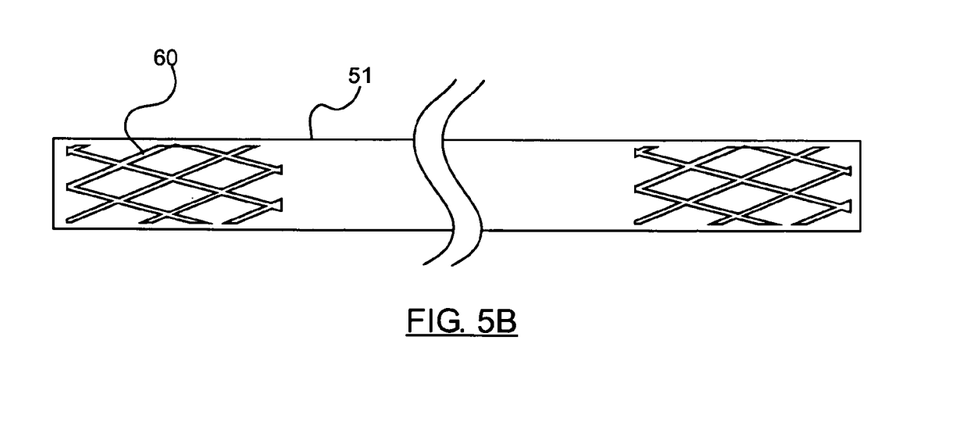
FIG. 5B is a side, sectioned view of the reinforcing tube of the lower support gasket of FIG. 4, shown with a differing engagement structure configuration.

In one embodiment, ¼ inch expanded metal is used, and is cut or formed into strips that are then welded to the steel tubes 51. In one aspect of the invention, a pair of strips is welded along the sides of the steel tubes along substantially the full length of the steel tubes. A wider strip 66 can be attached, in some applications, along an upper portion of the steel tubes to increase the bonding interface between the gasket material and the steel tubes. While the expanded metal can be attached along the entire length of the steel tube, if desired (as shown in FIG. 5A), in one aspect of the invention sectional pieces of shorter length can be attached to the tubes at various places along the length of the tubes, as illustrated by example in FIG. 5B. Attachment of the engagement structure to the reinforcement structure can be done in a variety of manners, including welding, bonding, bolting, screwing, lashing, etc.

Figure 6:
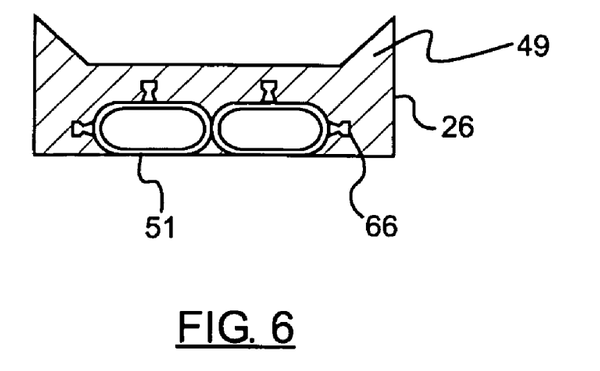
FIG. 6 is an end, sectional view of a lower support gasket in accordance with another aspect of the invention, having gasket material engagement structure extending therefrom.
Figure 7:
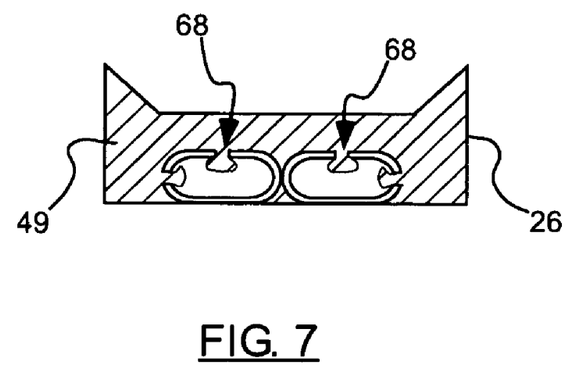
FIG. 7 is an end, sectional view of a lower support gasket in accordance with another aspect of the invention, having gasket material engagement structure formed therein.

Expanded metal is only one example of a wide range of suitable materials that might be used as the engagement material. A variety of other materials having some type of engagement structure associated therewith can also be used. In one example, shown schematically in FIG. 6, the engagement structure can include one or more lugs 66 that can be attached to, or can otherwise extend from, the elongate tubes 51 to engage the gasket material 49. In the example illustrated in FIG. 7, the engagement structure comprises a series of openings 68 formed through the elongate tubes 51. As the gasket material is formed about the tubes 51, some of the material is forced through the openings. Upon curing, the gasket material positively engages the openings to thereby secure the gasket material about the elongate tubes.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by any claims associated with this or related applications.

We claim:

1. A concrete mold device for vertically forming a concrete panel, comprising:
   a plurality of concrete forms for collectively defining a mold cavity for receiving an uncured concrete mixture therein, the concrete forms including:
   i) a pair of opposing side wall forms configured to define side wall surfaces of the mold cavity;
   ii) a pair of opposing end wall forms, configured to define end wall surfaces of the mold cavity; and
   iii) an elongate lower support gasket having an upper surface configured to define a bottom surface of the mold cavity, the lower support gasket being formed from a pliable material;

reinforcing structure, associated with and formed from a different material than, the lower support gasket to increase a load-bearing capacity of the lower support gasket; and engagement structure, comprising a sheet of expanded metal, the engagement structure being carried by the reinforcing structure and being operable to positively engage the pliable material of the lower support gasket to secure the lower support gasket to the reinforcing structure.

2. The device of claim 1, wherein the reinforcing structure comprises at least one substantially elongate bar, and wherein the expanded metal is attached to the elongate bar, the expanded metal including a series of at least partial openings formed therein, the material of the lower support gasket engaging the openings and thereby engaging the elongate bar.

3. The device of claim 1, wherein the reinforcing structure is formed of a different material than is the lower support gasket to increase a load-bearing capacity of the lower support gasket.

4. A concrete mold device for vertically forming a concrete panel, comprising:

a plurality of concrete forms for collectively defining a mold cavity for receiving an uncured concrete mixture therein, the concrete forms including:

i) a pair of opposing side wall forms configured to define side wall surfaces of the mold cavity;

ii) a pair of opposing end wall forms, configured to define end wall surfaces of the mold cavity; and iii) an elongate lower support gasket having an upper surface configured to define a bottom surface of the mold cavity, the lower support gasket being formed from a pliable material;

reinforcing structure comprising at least one substantially elongate bar, the reinforcing structure being associated with and formed from a different material than, the lower support gasket to increase a load-bearing capacity of the lower support gasket; and engagement structure comprising a perforated material including a series of at least partial openings formed therein, the engagement structure being carried by the reinforcing structure and being operable to positively engage the pliable material of the lower support gasket to secure the lower support gasket to the reinforcing structure.

5. The device of claim 4, wherein the engagement structure comprises expanded metal.

* * * * *